US011900054B1

(12) United States Patent
Agarwal et al.

(10) Patent No.: US 11,900,054 B1
(45) **Date of Patent: *Feb. 13, 2024**

(54) PLATFORM FOR GENERATING PUBLISHED REPORTS USING REPORT AND WORKSHEET BUILDING WITH POSITION MAPPING IDENTIFICATION

(71) Applicant: BANK OF AMERICA CORPORATION, Charlotte, NC (US)

(72) Inventors: Vikash Agarwal, Plainsboro, NJ (US); Rahul Tandon, Monroe Township, NJ (US); Suresh Solomon, Marlboro, NJ (US); Rajneesh Acharya, Princeton Junction, NJ (US); Mark Labbancz, Robbinsville, NJ (US); Ganesh Agrawal, Plainsboro, NJ (US); Laura A. Bertarelli Hamilton, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/898,169

(22) Filed: Aug. 29, 2022

(51) Int. Cl.
*G06F 40/00* (2020.01)
*G06F 40/186* (2020.01)
*G06F 40/18* (2020.01)
*G06F 40/103* (2020.01)

(52) U.S. Cl.
CPC .......... *G06F 40/186* (2020.01); *G06F 40/103* (2020.01); *G06F 40/18* (2020.01)

(58) Field of Classification Search
CPC ....... G06F 40/186; G06F 40/103; G06F 40/18
See application file for complete search history.

(56) References Cited

U.S. PATENT DOCUMENTS

| | | | |
|---|---|---|---|
| 7,647,551 | B2 | 1/2010 | Vigesaa |
| 9,135,233 | B2 | 9/2015 | Fan |
| 9,268,748 | B2 | 2/2016 | Davis |
| 9,355,085 | B2 | 5/2016 | Vigesaa |
| 9,514,205 | B1 | 12/2016 | Yazicioglu |
| 9,715,576 | B2 | 7/2017 | Hayter, II |
| 9,946,776 | B1 | 4/2018 | Yazicioglu |
| 10,019,494 | B2 | 7/2018 | Fan |
| 10,380,138 | B1 | 8/2019 | Yazicioglu |
| 10,409,892 | B2 | 9/2019 | Rothschiller |

(Continued)

*Primary Examiner* — Barbara M Level
(74) *Attorney, Agent, or Firm* — Moore & Van Allen PLLC; Nicholas C. Russell

(57) ABSTRACT

Systems, computer program products, and methods are described herein for providing a platform for generating published reports using report and worksheet building with position mapping identification. The present invention is configured to establish a reporting and analytics platform for a user interface and receive, from the user interface, a single-selection input referencing a set of system identification values associated with a first set of data in the reporting and analytics platform. The system may then display a plurality of formatting options for the set of system identification values on the user interface. The system can assign a selected formatting option to the system identification values and apply the selected formatting option to the first set of data in the reporting and analytics platform. The selected formatting options can be applied to additional sets of data based on system identification values.

18 Claims, 5 Drawing Sheets

200

ESTABLISH A REPORTING AND ANALYTICS PLATFORM FOR A USER INTERFACE
202

RECEIVE, FROM THE USER INTERFACE, A SINGLE-SELECTION INPUT REFERENCING A SET OF SYSTEM IDENTIFICATION VALUES ASSOCIATED WITH A FIRST SET OF DATA IN THE REPORTING AND ANALYTICS PLATFORM
204

IN RESPONSE TO RECEIVING THE SINGLE-SELECTION INPUT, DISPLAY A PLURALITY OF FORMATTING OPTIONS FOR THE SET OF SYSTEM IDENTIFICATION VALUES ON THE USER INTERFACE
206

RECEIVE, FROM THE USER INTERFACE, A SELECTION OF A SELECTED FORMATTING OPTION OF THE PLURALITY OF FORMATTING OPTIONS
208

ASSIGN THE SELECTED FORMATTING OPTION TO THE SYSTEM IDENTIFICATION VALUES
210

APPLY THE SELECTED FORMATTING OPTION TO THE FIRST SET OF DATA IN THE REPORTING AND ANALYTICS PLATFORM
212

RECEIVE A REQUEST TO IMPORT THE SELECTED FORMATTING OPTION TO A SECOND SET OF DATA ENTERED INTO THE REPORTING AND ANALYTICS PLATFORM
214

APPLY THE SELECTED FORMATTING OPTION TO FIELDS OF THE SECOND SET OF DATA WITHIN THE REPORTING AND ANALYTICS PLATFORM WITH SYSTEM IDENTIFICATION VALUES WITHIN THE SET OF SYSTEM IDENTIFICATION VALUES
216

(56) References Cited

U.S. PATENT DOCUMENTS

| | | | | |
|---|---|---|---|---|
| 10,504,626 | B2 | 12/2019 | Hayter, II | |
| 10,540,153 | B2 * | 1/2020 | Stachura | G06F 8/38 |
| 11,016,931 | B2 | 5/2021 | Griffith | |
| 11,068,498 | B2 | 7/2021 | Yazicioglu | |
| 11,087,885 | B2 | 8/2021 | Hayter, II | |
| 11,113,041 | B2 | 9/2021 | Stachura | |
| 11,157,689 | B2 | 10/2021 | Campbell | |
| 11,227,104 | B2 | 1/2022 | Sankaran | |
| 11,663,399 | B1 * | 5/2023 | Agarwal | G06F 21/31 715/220 |
| 2006/0010367 | A1 * | 1/2006 | Sattler | G06F 16/9038 715/764 |
| 2009/0006939 | A1 * | 1/2009 | DeSpain | G06F 40/18 715/217 |
| 2012/0072867 | A1 * | 3/2012 | Schlegel | G06F 3/0482 715/808 |
| 2013/0205192 | A1 * | 8/2013 | Spada | G06F 8/38 715/227 |
| 2014/0372854 | A1 * | 12/2014 | Otero | G06F 40/18 715/219 |
| 2017/0124054 | A1 * | 5/2017 | Campbell | G06F 3/0482 |
| 2019/0212878 | A1 * | 7/2019 | Otero | G06F 40/18 |
| 2021/0157978 | A1 * | 5/2021 | Haramati | G06F 16/2379 |
| 2022/0043828 | A1 | 2/2022 | Yazicioglu | |
| 2022/0130554 | A1 | 4/2022 | Hayter, II | |

* cited by examiner

PLATFORM FOR GENERATING PUBLISHED REPORTS USING REPORT AND WORKSHEET BUILDING WITH POSITION MAPPING IDENTIFICATION

FIELD OF THE INVENTION

The present invention embraces a system for providing a platform for generating published reports using report and worksheet building with position mapping identification.

BACKGROUND

The generation of reports based on underlying data can be a time consuming and error prone process when processing large or complex datasets, and particularly when processing multiple large and complex datasets that do not always have data of the same type located in the same positions. Conventional methods of applying formatting and functional rules to datasets requires the data entries across multiple workbooks to be in the same physical position (e.g., the same tab, row and column positions). However, distinct data aggregators (e.g., different workstreams, different practice groups, and the like) may account for and collect data with different methods, and may compile such data in different positions, in different detail, and with different levels of specificity.

As such, a need exists for a platform for generating published reports using report and worksheet building with position mapping identification that is capable of applying formatting or functional rules to underlying sets of data based on the characteristics of such underlying data, and not just the physical position of such data within a worksheet.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for generating published reports using report and worksheet building with position mapping identification. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve establishing a reporting and analytics platform for a user interface. The system may then receive, from the user interface, a single-selection input referencing a set of system identification values associated with a first set of data in the reporting and analytics platform. In response to receiving the single-selection input, the system may display a plurality of formatting options for the set of system identification values on the user interface. In some embodiments, the system maty receive, from the user interface, a selection of a selected formatting option of the plurality of formatting options. Next, the system assigns the selected formatting option to the system identification values. Finally, the system may apply the selected formatting option to the first set of data in the reporting and analytics platform.

In some embodiments, the system may further receive a request to import the selected formatting option to a second set of data entered into the reporting and analytics platform. In such embodiments, the system may apply the selected formatting option to fields of the second set of data within the reporting and analytics platform with system identification values within the set of system identification values.

In some embodiments of the invention, the first set of data comprises a set of fields in a data worksheet, wherein the set of fields comprises an individual cell, a range of cells, an individual column, a range of columns, an individual column header, a range of column headers, an individual row, a range of individual rows, or all cells of the data worksheet.

The plurality of formatting options described with respect to the invention may comprise two or more dynamic formatting options comprising field fill color, field text color, field font size, italics, bold, underline, font style, and field border stye, or conditional formatting options comprising dynamic formatting based on ranges, thresholds, field content, and comparative metrics.

The step(s) of displaying a plurality of formatting options for the set of system identification values on the user interface may, in some embodiments, comprise determining data characteristics of the first set of data based on the set of system identification values. The system can then identify a set of formatting options related to the characteristics. Finally, the system may display just the set of formatting options related to the characteristics on the user interface.

The system may, in some embodiments, generate a formatting template that includes the selected formatting option linked with the set of system identification values in addition to one or more additional formatting options linked with other system identification values. The system may then receive a request to import the formatting template to a second set of data entered into the reporting and analytics platform and apply the selected formatting option to fields of the second set of data within the reporting and analytics platform with system identification values within the set of system identification values.

In some embodiments, the system may receive a request to refresh the reporting and analytics platform for a user interface. The system may then determine that the first set of data in the reporting and analytics platform has changed based on a variation in input data and apply the selected formatting option to the changed first set of data in the reporting and analytics platform.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
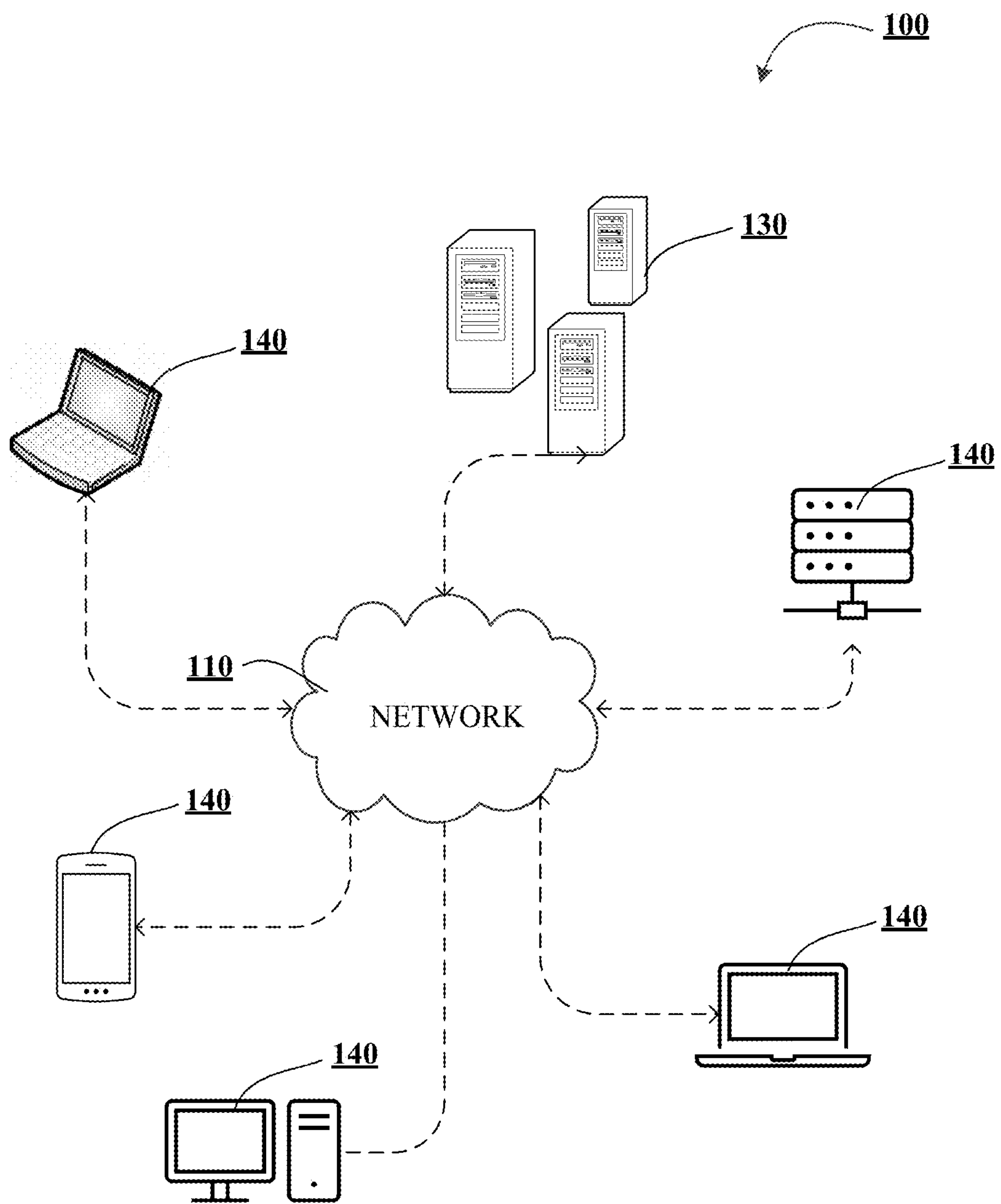
Figure 1B:
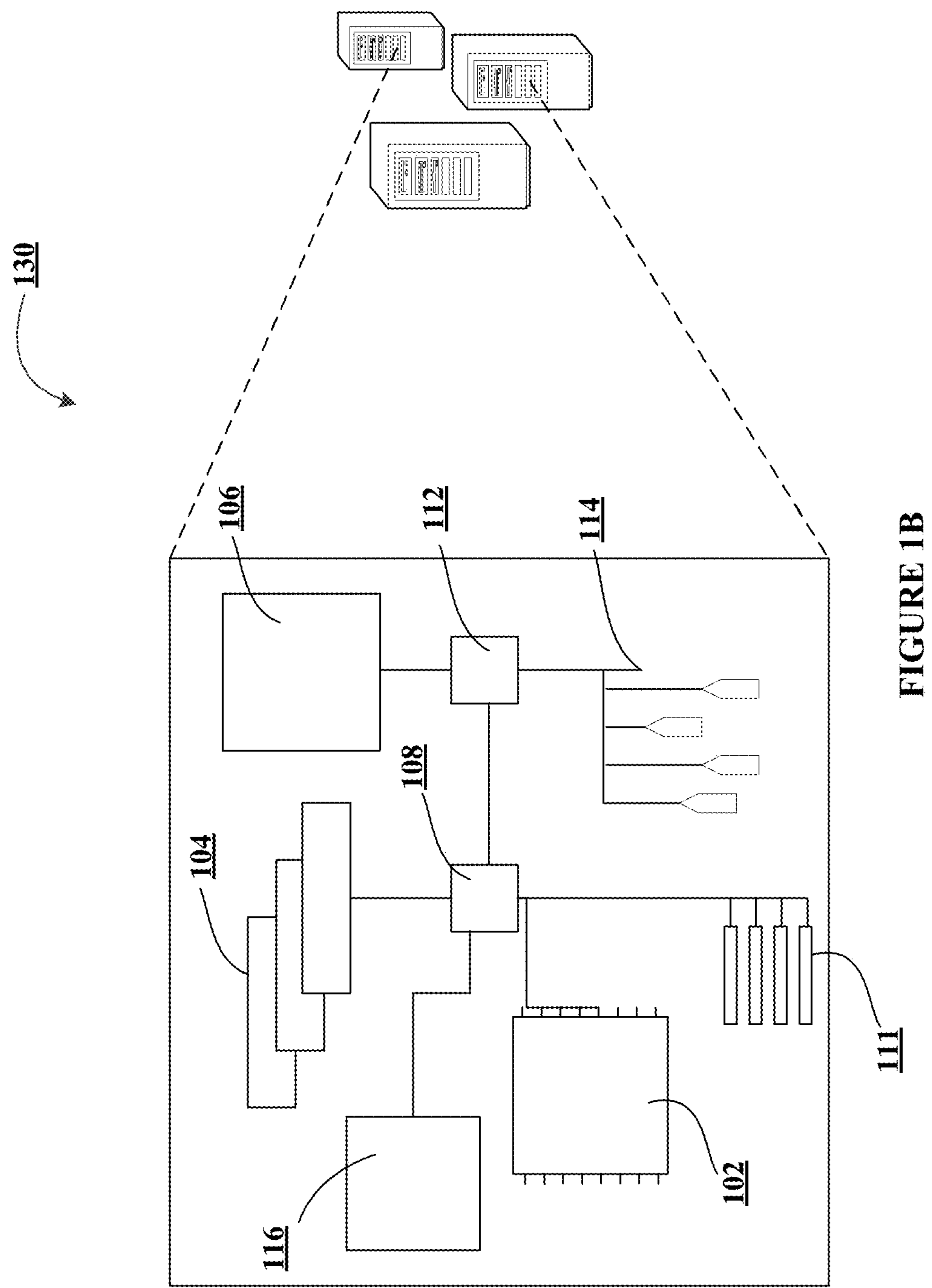
Figure 1C:
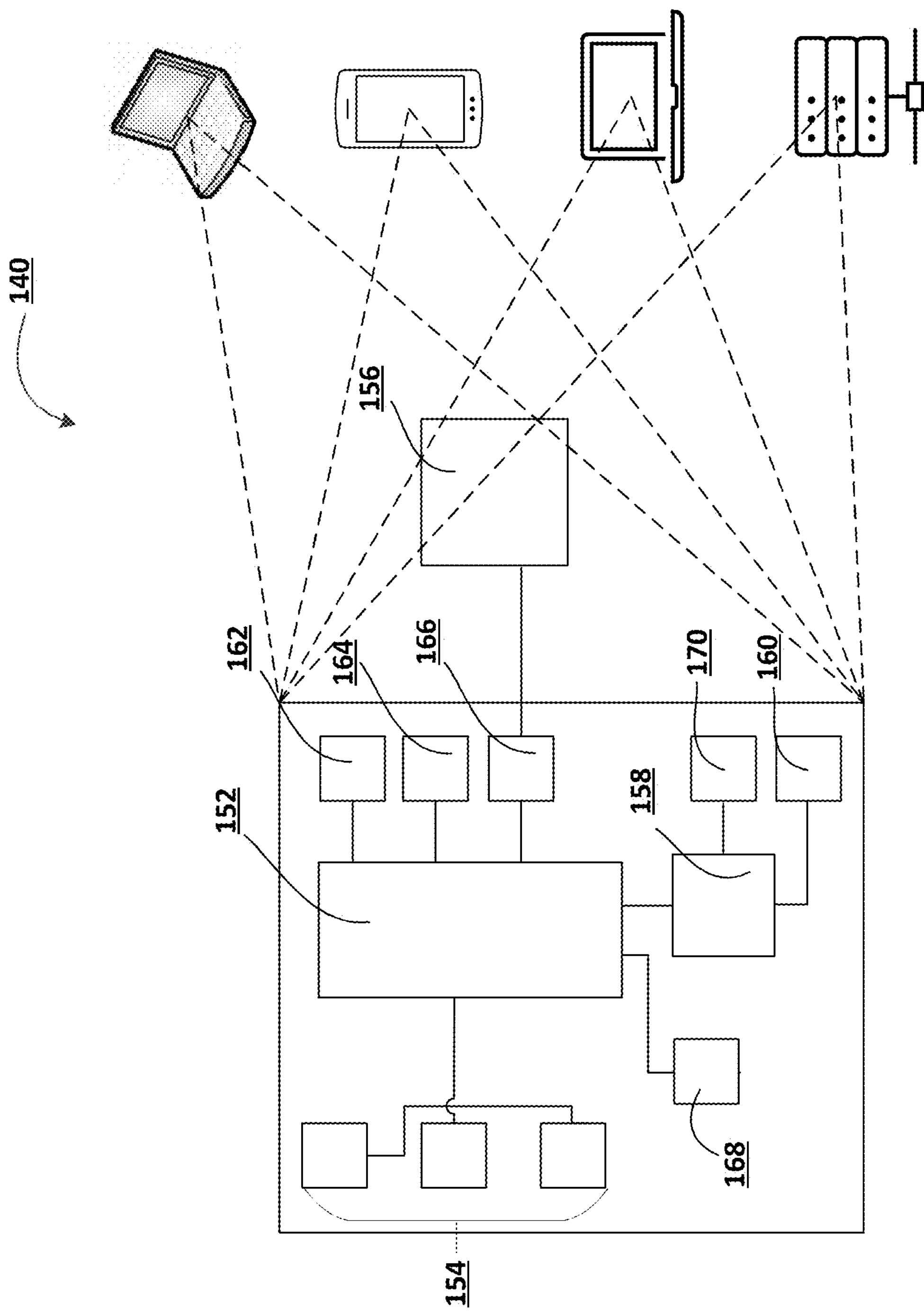
Figure 2:
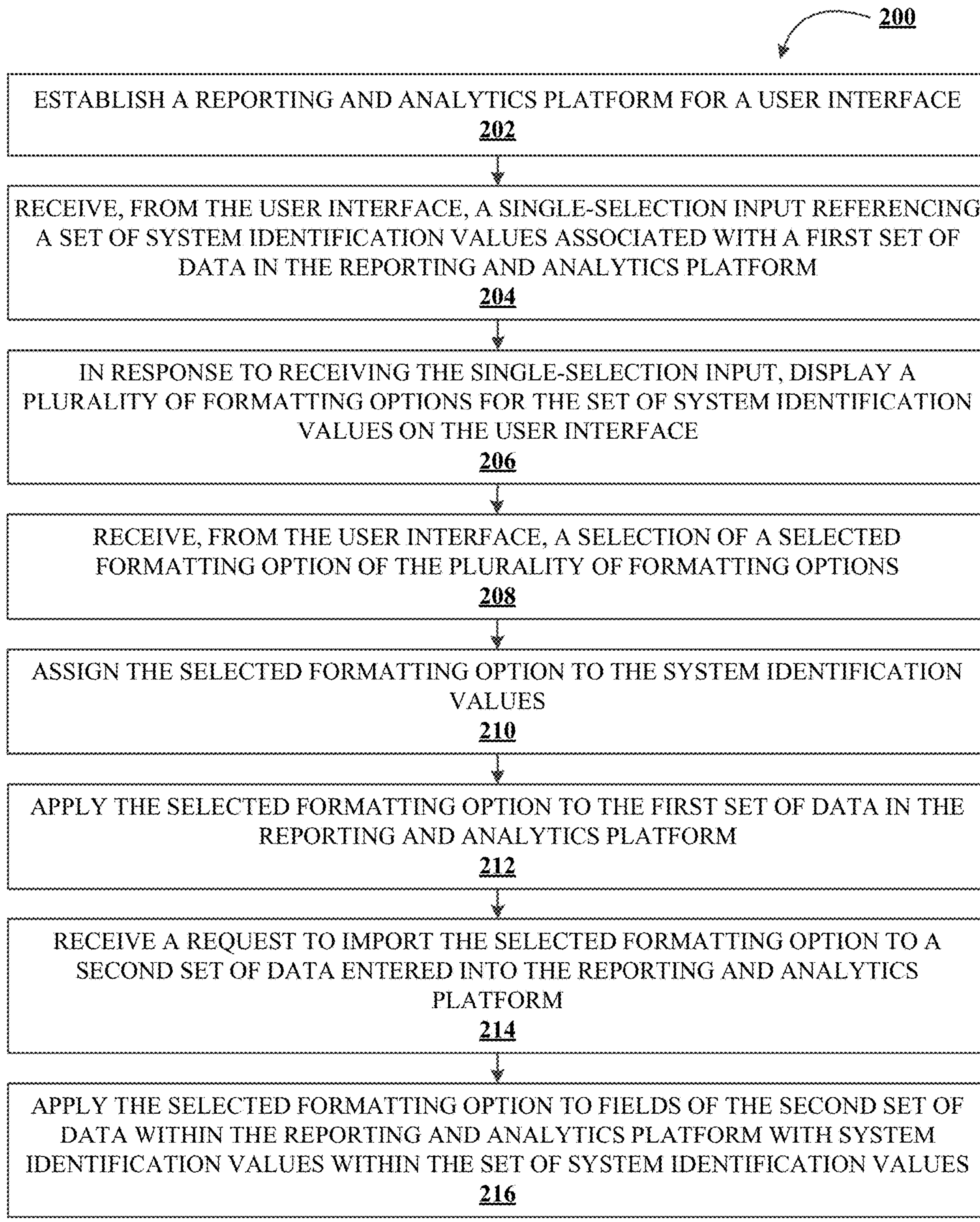
Figure 3:
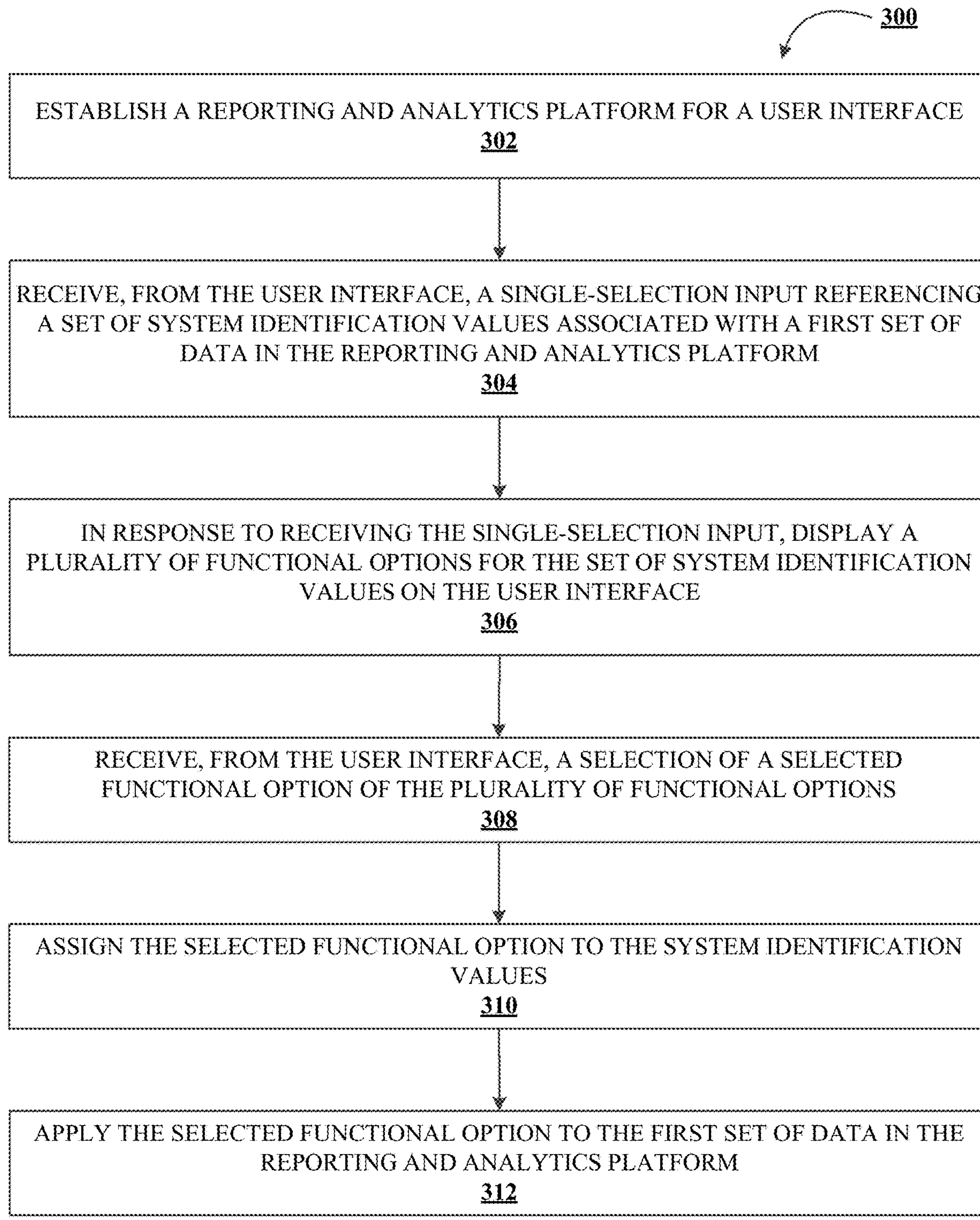

Having thus described embodiments of the invention in general terms, reference will now be made the accompanying drawings, wherein:

FIGS. 1A-1C illustrates technical components of an exemplary distributed computing environment for providing a platform for generating published reports using report and worksheet building with position mapping identification and template carryover reporting, in accordance with an embodiment of the invention;

FIG. 2 illustrates a process flow for providing a platform for generating published reports using report and worksheet building with position mapping identification, in accordance with an embodiment of the invention; and FIG. 3 illustrates a process flow for providing a platform for generating published reports with position mapping identification and template carryover reporting.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

The inventions described herein provide a single reporting and analytics platform. The system connects to different data source systems and applications (e.g., within an entity and/or in connection with third party entities or data feeds) to extract the data and load it into the system memory to create attributes for reporting and analytics. The system creates a real-time integration of internal data sources (and, in some embodiments, external data sources) for generation of reports and analytics. The platform uses rows, columns, measures (e.g., numerical value, percentage values, and the like), and filters to make up a data grid. The platform allows users to take large amounts of source system data into attributes that can be manipulated into row or column dimensions. The platform has a report builder and worksheet builder to create published reports based on the underlying data and certain formatting and/or functional conditions applied to the data within the platform. The platform can map all the displayed data to a particular point that is referenced, a system identification value. Each cell is not identified by the platform based on a number value or text value, but instead a system identification value is assigned or generated based on the dimensions and characteristics (e.g., data source, data type, data value, data acquisition time, geographical region associated with the data, line of business associated with the data, precision of the data value, frequency of data capture associated with the data value, and the like) for a particular cell. This allows for numerical data (and text data, time data, hybrid data, and the like) to change over time, while also allowing for formatting, styling, commentary, or the like to stay with displayed data or to stay with a specific dimension across worksheets, based on the system identification value for the associated cell(s), which will remain the same.

In some embodiments of the invention, navigation of the platform and the application of formatting and/or functional processes can be performed with one click options of context options. Furthermore, the platform gives a user the ability to do conditional or dynamic formatting within row, column, column-header, or cell level. This allows the user to dynamically style the data grid within the platform based on certain selected or assigned criteria. As the data in a cell change and meets or doesn't meet the criteria, the styling may change for that data, based on the formatting or functional processes assigned to the associated data fields. This formatting is downloadable or migratable across worksheets (e.g., as a template) and across system identification values.

Importantly, the formatting of a new (or different) dataset is conducted based on the system identification values of the underlying data fields, which is based on the characteristics of the underlying data and not just the physical position of the underlying data within a spreadsheet. For example, if a template is applied to a new data spreadsheet, where the new data spreadsheet has its columns in a different order than an original data spreadsheet (e.g., a spreadsheet that was used to generate the template), the system is still able to apply the correct formatting because the system identification values for each column will be the same (i.e., regardless of the physical positions of the columns in the spreadsheet).

In some embodiments, the platform allows users to drill-down and filter data at a sub level to enable them to view the sources, underlying datasets, acquisition parameters, and commentary associated with a particular data entry in the platform along with the current worksheet display at the same time. The user can also configure or filter the degree of specificity, or the number of sub-levels of data sources that they want to view in the platform but, unlike the drilldown feature, the current screen just displays information regarding the data that is being filtered on.

The platform may also allow users to create and store a ready-made template worksheet with sophisticated formulas that can calculate variances or any other type of mathematical function such as distribution, financial trend/forecasting or revenue contribution which then can be used to create other worksheets. The formatting and functional attributes and rules of each template is based not on the physical location of cells, columns, rows, headers, or the like within a spreadsheet, but instead is based on system identification values that are generated for each cell, column, row, header, or the like. The system identification values are based on identified or assigned characteristics of the underlying data, and the platform can identify such system identification values without regard to the physical location of the associated data fields in a workbook. The mathematical functions can be created by combination of rows or columns or cells and can create granularity transformations. The template creator has the ability to limit the attributes the new users of the template are able to access, view, manipulate, or change the formatting of. The new user of the template can then customize the new worksheet in any other manner than the limitations imposed by the template creator. These worksheets created with the template can work with any new incremental data with the readily available calculations built in. The templates are generated dynamically based on changes to data. Templates automatically identify rows and columns to use based on the system identification values and the specific template for each dataset or worksheet is chosen or generated from that underlying system identification value knowledge.

Accordingly, the present invention involves the generation of, and use of, a reporting and analytics platform that assigns and tracks formatting and/or functional rules and processes for underlying data based on system identification values instead of spreadsheet location information.

As an example of the process for generating a formatting rule within the reporting and analytics platform, the system may initially establish a reporting and analytics platform for a user interface. A user then provides an input referencing a set of system identification values associated with a first set of data in the reporting and analytics platform. In response to receiving the single-selection input, a plurality of formatting options for the set of system identification values are displayed on the user interface. As part of a "one click" feature, the specific formatting options may vary, and can be based on the underlying characteristics associated with the system identification value(s) of the selected cells. Formatting options can include dynamic formatting options (e.g., font, fill, and border options), and/or conditional formatting options (e.g., based on ranges, thresholds, comparative metrics, and complex algorithms).

The user then selects one of the formatting options, via the user interface. The formatting option is assigned to, or otherwise linked with the system identification values of the selected cells. The selected formatting option is applied to the associated first set of data in the reporting and analytics platform, and displayed on the user interface. As the underlying data associated with these system identification values changes, the formatting rules continue to apply, and the formatting of the individual cells, rows, columns, and/or headers, may change depending on the new data values. Subsequently, a new dataset can be accessed by the reporting and analytics platform, and previously-defined formatting rules or templates can be applied to the new datasets.

Importantly, the formatting of the new dataset is conducted based on the system identification values of the underlying data fields, which is based on the characteristics of the underlying data and not just the position of the underlying data within a spreadsheet.

As an example of the process for generating a functional rule within the reporting and analytics platform, the system may initially establish a reporting and analytics platform for a user interface. A user then provides an input referencing a set of system identification values associated with a first set of data in the reporting and analytics platform. In response to receiving the single-selection input, a plurality of functional options for the set of system identification values are displayed on the user interface.

As part of a "one click" feature, the specific functional options may vary, and can be based on the underlying characteristics associated with the system identification values of the selected cells. One example of the functional options includes entitlement permissions and restrictions for the associated data (e.g., permissions-based restrictions on individual users regarding which data can be accessed, viewed, formatted, or otherwise manipulated by such individual users). Another example of the functional options includes the insertion of rows, charts, or tables based on complex mathematical formulas and algorithms. Another example of the functional options includes the provision of drill-down features for presenting underlying or contributing data and data sources based on a user selection. For example, a user may want to understand the data sources, calculations, and other inputs and characteristics associated with a reported data value. By selecting the reported data value in the platform and selecting the drill-down option within the user interface, the platform will present to the user information regarding the source(s) of the data that were used to generate the reported data amount, and such information can be extended to multiple sub-levels of the data acquisition. Similarly, one of the functional options may be a filtering feature that focuses the user interface display on the underlying or contributing data and data sources while hiding, omitting, or redacting the other report information that is not pertinent to the generation of the selected reported data value.

The user then selects one of the functional options via the user interface. The selected functional option is assigned to, or otherwise linked with the system identification values of the selected cells (i.e., the option is not simply linked to a row and column location of a data point in a spreadsheet, but instead is linked to a system identification value that is based on the underlying characteristics of the data field). The selected functional option is then applied to the associated first set of data in the reporting and analytics platform.

Functional (and/or formatting) templates based on one or more assignments of functional options to sets of system identification values can be generated and stored as part of the platform. As new datasets are received, the functional (and/or formatting) templates can be imported to apply to the new data. The functional and/or formatting rules are based on the system identification values of the new data, and not solely on positional data within a spreadsheet. New users may be restricted from editing the formatting and/or functional options for specific data for at least some of the system identification values associated with the imported template.

What is more, the present invention provides a technical solution to a technical problem. As described herein, the technical problem includes the generation of templates for formatting data, applying functions to data, and/or applying permissions-based rules for controlling the degree to which an individual user can access, view, modify, copy, delete, format, or otherwise interact with certain data within a platform in a manner that is ambivalent to the position of the data field within its spreadsheet or other data source. The technical solution presented herein allows for applying formatting or functional actions to any cells or fields that have the same system identification value (regardless of their positioning within a spreadsheet or other data source.

The system described herein generates or identifies the system identification values for each cell, field, column, row, header, and the like within a spreadsheet, workbook, data feed, or other data source, and if the template being applied to the data source includes a formatting or functional action associated with the generated or identified system identification value (again, regardless of physical location or position within the data source), then the system applies such formatting or functional action. In particular, applying formatting and/or functional actions to data fields in a platform based on system identification values is an improvement over existing solutions to the problem of applying consistent analysis and reporting functions for multiple datasets received from multiple sources, or received in different structural layouts, (i) with fewer steps to achieve the solution, thus reducing the amount of computing resources, such as processing resources, storage resources, network resources, and/or the like, that are being used, (ii) removing manual input and waste from the implementation of the solution, thus improving speed and efficiency of the process and conserving computing resources, and (iii) determining an optimal amount of resources that need to be used to implement the solution, thus reducing network traffic and load on existing computing resources.

For example, to apply a similar solution to the standard formatting template processes, the underlying data would need to be re-structured to meet the exact formatting layout of the template. However, by using the system identification values to identify which cells, columns, rows, headers, and the like, to apply formatting or functional actions to, the processes described herein remove additional process steps, improve processing speeds, and remove the potential for manual errors in processing large and otherwise burdensome amounts of data and information. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for providing a platform for generating published reports using report and worksheet building with position mapping identification and template carryover reporting 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Referring now to FIG. 2, a flowchart is provided to illustrate one embodiment of a process 200 for providing a platform for generating published reports using report and worksheet building with position mapping identification, in accordance with embodiments of the invention. In some embodiments, the process 200 may include block 202, where the system establishes a reporting and analytics platform for a user interface. The reporting and analytics platform may, in some embodiments, be the same as the point identification indicator described in more detail in the jointly owned U.S. patent application Ser. No. 17/896,609 entitled "SYSTEM AND METHOD FOR DATA ANALYSIS AND PROCESSING USING IDENTIFICATION TAGGING OF INFORMATION ON A GRAPHICAL USER INTERFACE" filed Aug. 26, 2022.

The platform may be a web-based single reporting and analytics platform, which received data from multiple internal and/or external sources, normalizes it, and automatically generates reports, analytical views, and narratives. It can be a dynamic self-service analytical and management reporting tool. The platform maybe configured to enable its users with useful and scalable capabilities, without having limitations on the input data, the physical locations of data, and the like. The platform can be a real-time integration solution for a managing entity that has significant internal data resources, and significant external data feed, resources, databases, and the like. The user interface of the platform can be configured to organize and filter data with simple clicks and drags of cursors, sliders, and the like to enable users to quickly shift and pivot results in and out of spreadsheet applications.

Users can simply select rows/columns/headers from the data table of the platform and then with one right click they can perform various processes by selecting what they want to do from a context menu that appears. Examples of actions that can be taken by a user with the single-click technique include calculations (e.g., average, blank, change, change %, max, min, sum), dual aggregations (i.e., selected rows will be converted from summation to avg calc), formatting (e.g., formatting of headers, rows, columns, and/or cells), hide columns, hide rows, graph creation, exporting data, merging rows, filtering rows with interest, pin column (e.g., freezing panes), keep only certain rows, remove columns/transformations, and the like.

In some embodiments, the process 200 includes block 204, where the system receives, from the user interface, a single-selection input referencing a set of system identification values associated with a first set of data in the reporting and analytics platform. The system identification values may be assigned to data fields of the underlying worksheet or dataset (or assigned as they are pulled into the platform) based on the type of data, the level of granularity, the source of the data, the date of data capture, the line of business and/or sub-line of business associated with the data, and the like. In some embodiments, the system identification values comprise sets of characteristic tags (e.g., line of business 1, acquired on MM/DD/YYYY acquired at XX:XX PM, units of XX, received from data source 1) for the data. In some embodiments, the system identification value may be a hash or combination of the underlying data characteristics. In some embodiments, the system identification values are numeric, alphanumeric, and/or alphabetical. Importantly, the system will be able to identify and/or track the system identification values for all data points at any point in time, even if the position of the data within the underlying data source (e.g., a spreadsheet) moves.

The first set of data may comprise a set of fields in a data worksheet, wherein the set of fields comprises an individual cell, a range of cells, an individual column, a range of columns, an individual column header, a range of column headers, an individual row, a range of individual rows, or all cells of the data worksheet.

Additionally, in some embodiments, the process 200 includes block 206 where, in response to receiving the single-selection input, the system displays a plurality of formatting options for the set of system identification values on the user interface the system.

The plurality of formatting options may comprise two or more dynamic formatting options comprising field fill color, field text color, field font size, italics, bold, underline, font style, and field border stye, or conditional formatting options comprising dynamic formatting based on ranges, thresholds, field content, and comparative metrics.

Displaying the plurality of formatting options for the set of system identification values on the user interface may, in some embodiments comprise determining data characteristics of the first set of data based on the set of system identification values. The system may then identify a set of formatting options related to the characteristics. The system can then display just the set of formatting options related to the characteristics on the user interface.

In this way, the system can present options to allow a user to dynamically style the display (e.g., a grid, spreadsheet, table, chart, or the like) based on the underlying data changing. This can allow users to easily see trends, identify triggering events, and otherwise manage large sets of data as they change over time.

The process 200 may also include block 208, where the system receives, from the user interface, a selection of a selected formatting option of the plurality of formatting options. The presentation and selection of options may be done through a single-click mechanism, and/or may be conducted through the use of a separate pane made available to the user on the user interface display.

In some embodiments, the process 200 includes block 210, where the system assigns the selected formatting option to the system identification values. This assignment is made to the system identification values, and not just to the underlying data, or the underlying physical or spatial location of cells within a workbook. As such, the assigned options can be applied to any underlying data that is linked with the same system identification value, regardless of the physical or spatial location of such cells. As described below, this feature can also be used to apply the same options to data in different, separate workbooks, even when the formatting, structure, or layout of the new workbook is different from the underlying workbook.

Additionally, in some embodiments, the process 200 includes block 212, where the system applies the selected formatting option to the first set of data in the reporting and analytics platform. The application of these options may involve changing the displays of the data within the platform, and can change dynamically as the underlying data changes.

The process 200 may include block 214, where the system receive a request to import the selected formatting option to a second set of data entered into the reporting and analytics platform. For example, a user may receive a new dataset that is similar to the first data set for which the user has already assigned formatting options to the system identification values. But the new dataset may not have its data in the same order, or may be missing a row or column that was in the previous data set. Regardless of those issues, as long as some of the system identification values of the data that is within the new dataset matches the system identification values of the data that is within the original dataset, then the system can apply the same type of formatting to those data fields with the matching identification values. This is especially useful tool when the same types of data are provided in an inconsistent structure from multiple sources.

Finally, the process 200 may include block 216, where the system applies the selected formatting option to fields of the second set of data within the reporting and analytics platform with system identification values within the set of system identification values. As noted above, the system does not require the data of the second set of data to be in the same position as the first set of data. The system will identify the system identification values for the data in the second set of data, and will apply the assigned formatting options for those system identification values to the appropriate data fields.

Additionally or alternatively, the system may generate a formatting template that includes the selected formatting option linked with the set of system identification values in addition to one or more additional formatting options linked with other system identification values. Subsequently, the system may receive a request to import the formatting template to a second set of data entered into the reporting and analytics platform. The system can then apply the selected formatting option to fields of the second set of data within the reporting and analytics platform with system identification values within the set of system identification values.

In a similar manner, the system may subsequently receive a request to refresh the reporting and analytics platform for a user interface. After refreshing the data feeds, or otherwise analyzing the input data for the platform, the system may then determine that the first set of data in the reporting and analytics platform has changed based on a variation in input data. The system can then apply the selected formatting option to the changed first set of data in the reporting and analytics platform.

Using this template based structure, the platform allows for easy template-based reporting. The users can easily create a ready-made template worksheet with sophisticated formulas that can calculate variances or any other type of mathematical function such as distribution, financial trend/forecasting or revenue contribution which then can be used to create other worksheets. The template creator has the ability to limit the attributes the new users of the template are exposed to. The new user of the template can then customize the new worksheet anyway they wish. These worksheets created with the template can work with any new incremental data with the readily available calculations built in. Features like this help enhance the already robust platform application by helping the user community preform their tasks quicker and more accurately than with conventional methods while also giving the creator the ability to limit the attributes users have. The users do not need to recreate all the formulas/calculations needed for a worksheet, or require all worksheets or data entries to have the same structure, layout, or dimensions. Instead, the use of system identification values allows the user to apply the same type of formatting (or functional applications) across multiple worksheets, regardless of the physical or spatial location of the data in each subsequent worksheet.

Referring now to FIG. 3, a flowchart is provided to illustrate one embodiment of a process 300 for providing a platform for generating published reports with position mapping identification and template carryover reporting, in accordance with embodiments of the invention. In some embodiments, the process 300 may include block 302, where the system establishes a reporting and analytics platform for a user interface. The platform may be the same or similar to the one described with respect to FIG. 2.

In some embodiments, the process 300 includes block 304, where the system receives, from the user interface, a single-selection input referencing a set of system identification values associated with a first set of data in the reporting and analytics platform.

Additionally, in some embodiments, the process 300 includes block 306 where in response to receiving the single-selection input, the system displays a plurality of functional options for the set of system identification values on the user interface. The plurality of functional options may include permission standards regarding a set of users that is allowed to access, view, or edit the first set of data. These permissions are not just done on one level. Instead, they can be done at the host application, dataset, line of business, and even user classification level. Restrictions are also made on the data at the owner level. If there is no sign off on access by the data owner then user access will not be permitted. With this integration being configured within, the permissions process runs faster and more precise than under conventional methods, leaving less room for human error and more importantly controls and restricts users from what they can see.

The plurality of functional options may, in some embodiments, include two or more mathematical, transformation, or algorithmic functions. The user can create a custom math function using a combination of rows or columns or cells. The user also has ability to create granularity transformations which can create multiple transformations at once based on defined user grouping and show data at the lowest level. The cells will highlight accordingly as well to show where the calculated value came from. The user simply picks the rows, columns or cells and picks insert custom from the context menu. In the next popup the user can define what formula to use with those rows, columns or cells and the system will calculate the value using the formula.

The system runs a powerful algorithm to take the users input for a math formula and run the calculation. The ability to do granularity transformations allows the user to do a couple clicks and insert many calculated rows instead of picking each group individually. This gives the user the ability to see data at the lowest level.

The process 300 may also include block 308 where the system receives, from the user interface, a selection of a selected functional option of the plurality of functional options. In some embodiments, the process 300 includes block 310, where the system assigns the selected functional option to the system identification values.

Finally, in some embodiments, the process 300 includes block 312, where the system applies the selected functional option to the first set of data in the reporting and analytics platform.

Additionally, the system may receive a request from a user interface of a new user to open the reporting and analytics platform.

In some embodiments, the system may then determine that the new user does not meet the permission standards and redact the first set of data from the display of the reporting and analytics platform.

Additionally or alternatively, in response to determining that the user does not meet the permission standards, the system may prohibit the new user from copying, revising, deleting, or formatting the first set of data within the display of the reporting and analytics platform.

As one or more users establish functional rules that are linked with system identification values, the users can establish templates that may be imported or otherwise applied to multiple other (e.g., new, periodically updated, revised, or the like) databases, worksheets, or other data sources. As such, the system may generate a functional template that includes the selected functional option linked with the set of system identification values in addition to one or more additional functional options linked with other system identification values.

The system can then receive a request to import the functional template to a second set of data entered into the reporting and analytics platform and apply the selected functional option to fields of the second set of data within the reporting and analytics platform with system identification values within the set of system identification values.

In some such embodiments, the user(s) that generate a template may have a need to restrict the types of formatting or additional functional actions that are applied on top of, or as a change to the generated templates. As such, in some embodiments where the request to import the functional template to a second set of data entered into the reporting and analytics platform is associated with a new user that was not associated with generating the functional template, the system may restrict the new user from changing a set of the functional options of the functional template. The system can also permit the new user to change a separate and distinct set of the functional options of the functional template.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the “C” programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a platform for generating published reports using report and worksheet building with position mapping identification, the system comprising:

at least one non-transitory storage device; and at least one processor coupled to the at least one non-transitory storage device, wherein the at least one processor is configured to:

establish a reporting and analytics platform for a user interface;

receive, from the user interface, a single-selection input referencing a set of system identification values associated with a first set of data in the reporting and analytics platform;

in response to receiving the single-selection input, display a plurality of formatting options for the set of system identification values on the user interface;

receive, from the user interface, a selection of a selected formatting option of the plurality of formatting options;

assign the selected formatting option to the system identification values;

apply the selected formatting option to the first set of data in the reporting and analytics platform;

generate a formatting template that includes the selected formatting option linked with the set of system identification values in addition to one or more additional formatting options linked with other system identification values;

receive a request to import the formatting template to a second set of data entered into the reporting and analytics platform; and apply the selected formatting option to fields of the second set of data within the reporting and analytics platform with system identification values within the set of system identification values.

2. The system of claim 1, wherein the at least one processor is further configured to:

receive a request to import the selected formatting option to a second set of data entered into the reporting and analytics platform; and apply the selected formatting option to fields of the second set of data within the reporting and analytics platform with system identification values within the set of system identification values.

3. The system of claim 1, wherein the first set of data comprises a set of fields in a data worksheet, wherein the set of fields comprises an individual cell, a range of cells, an individual column, a range of columns, an individual column header, a range of column headers, an individual row, a range of individual rows, or all cells of the data worksheet.

4. The system of claim 1, wherein the plurality of formatting options comprises two or more dynamic formatting options comprising field fill color, field text color, field font size, italics, bold, underline, font style, and field border style, or conditional formatting options comprising dynamic formatting based on ranges, thresholds, field content, and comparative metrics.

5. The system of claim 1, wherein displaying a plurality of formatting options for the set of system identification values on the user interface comprises:

determining data characteristics of the first set of data based on the set of system identification values;

identifying a set of formatting options related to the characteristics; and displaying just the set of formatting options related to the characteristics on the user interface.

6. The system of claim 1, wherein the at least one processor is further configured to:

receive a request to refresh the reporting and analytics platform for a user interface;

determine that the first set of data in the reporting and analytics platform has changed based on a variation in input data; and apply the selected formatting option to the changed first set of data in the reporting and analytics platform.

7. A computer program product for providing a platform for generating published reports using report and worksheet building with position mapping identification, the computer program product comprising a non-transitory computer-readable medium comprising code causing an apparatus to:

establish a reporting and analytics platform for a user interface;

receive, from the user interface, a single-selection input referencing a set of system identification values associated with a first set of data in the reporting and analytics platform;

in response to receiving the single-selection input, display a plurality of formatting options for the set of system identification values on the user interface;

receive, from the user interface, a selection of a selected formatting option of the plurality of formatting options;

assign the selected formatting option to the system identification values;

apply the selected formatting option to the first set of data in the reporting and analytics platform;

generate a formatting template that includes the selected formatting option linked with the set of system identification values in addition to one or more additional formatting options linked with other system identification values;

receive a request to import the formatting template to a second set of data entered into the reporting and analytics platform; and apply the selected formatting option to fields of the second set of data within the reporting and analytics platform with system identification values within the set of system identification values.

8. The computer program product of claim 7, wherein the apparatus is further configured to:

receive a request to import the selected formatting option to a second set of data entered into the reporting and analytics platform; and apply the selected formatting option to fields of the second set of data within the reporting and analytics platform with system identification values within the set of system identification values.

9. The computer program product of claim 7, wherein the first set of data comprises a set of fields in a data worksheet, wherein the set of fields comprises an individual cell, a range of cells, an individual column, a range of columns, an individual column header, a range of column headers, an individual row, a range of individual rows, or all cells of the data worksheet.

10. The computer program product of claim 7, wherein the plurality of formatting options comprises two or more dynamic formatting options comprising field fill color, field text color, field font size, italics, bold, underline, font style, and field border style, or conditional formatting options comprising dynamic formatting based on ranges, thresholds, field content, and comparative metrics.

11. The computer program product of claim 7, wherein displaying a plurality of formatting options for the set of system identification values on the user interface comprises:

determining data characteristics of the first set of data based on the set of system identification values;

identifying a set of formatting options related to the characteristics; and displaying just the set of formatting options related to the characteristics on the user interface.

12. The computer program product of claim 7, wherein the apparatus is further configured to:

receive a request to refresh the reporting and analytics platform for a user interface;

determine that the first set of data in the reporting and analytics platform has changed based on a variation in input data; and apply the selected formatting option to the changed first set of data in the reporting and analytics platform.

13. A method for providing a platform for generating published reports using report and worksheet building with position mapping identification, the method comprising:

establishing a reporting and analytics platform for a user interface;

receiving, from the user interface, a single-selection input referencing a set of system identification values associated with a first set of data in the reporting and analytics platform;

in response to receiving the single-selection input, displaying a plurality of formatting options for the set of system identification values on the user interface;

receiving, from the user interface, a selection of a selected formatting option of the plurality of formatting options;

assigning the selected formatting option to the system identification values;

applying the selected formatting option to the first set of data in the reporting and analytics platform;

generating a formatting template that includes the selected formatting option linked with the set of system identification values in addition to one or more additional formatting options linked with other system identification values;

receiving a request to import the formatting template to a second set of data entered into the reporting and analytics platform; and applying the selected formatting option to fields of the second set of data within the reporting and analytics platform with system identification values within the set of system identification values.

14. The method of claim 13, wherein the method further comprises:

receiving a request to import the selected formatting option to a second set of data entered into the reporting and analytics platform; and applying the selected formatting option to fields of the second set of data within the reporting and analytics platform with system identification values within the set of system identification values.

15. The method of claim 13, wherein the first set of data comprises a set of fields in a data worksheet, wherein the set of fields comprises an individual cell, a range of cells, an individual column, a range of columns, an individual column header, a range of column headers, an individual row, a range of individual rows, or all cells of the data worksheet.

16. The method of claim 13, wherein the plurality of formatting options comprises two or more dynamic formatting options comprising field fill color, field text color, field font size, italics, bold, underline, font style, and field border style, or conditional formatting options comprising dynamic formatting based on ranges, thresholds, field content, and comparative metrics.

17. The method of claim 13, wherein displaying a plurality of formatting options for the set of system identification values on the user interface comprises:

determining data characteristics of the first set of data based on the set of system identification values;

identifying a set of formatting options related to the characteristics; and displaying just the set of formatting options related to the characteristics on the user interface.

18. The method of claim 13, wherein the method further comprises:

receiving a request to refresh the reporting and analytics platform for a user interface;

determining that the first set of data in the reporting and analytics platform has changed based on a variation in input data; and applying the selected formatting option to the changed first set of data in the reporting and analytics platform.

* * * * *